United States Patent [19]

Belttary

[11] 4,351,583
[45] Sep. 28, 1982

[54] ELECTRICAL TERMINAL

[75] Inventor: Harold E. Belttary, Rio Piedras, P.R.

[73] Assignee: GTE Products Corporation, Stamford, Conn.

[21] Appl. No.: 160,897

[22] Filed: Jun. 19, 1980

[51] Int. Cl.³ .............................................. H01R 4/48
[52] U.S. Cl. ............................................... 339/259 R
[58] Field of Search .......... 339/255 R, 259 R, 278 C; 200/260, 282, 290

[56] References Cited

U.S. PATENT DOCUMENTS

| | | | |
|---|---|---|---|
| 1,327,844 | 1/1920 | Schaefer | 200/282 |
| 2,134,074 | 10/1938 | Chirelstein | 339/259 R |
| 3,054,025 | 9/1962 | Edmunds | 317/119 |
| 3,114,023 | 12/1963 | Locher | 200/116 |
| 3,144,588 | 8/1964 | Platz et al. | 317/119 |
| 3,478,299 | 11/1969 | Cinatl et al. | 339/278 C |
| 4,278,316 | 7/1981 | White | 339/259 R |

FOREIGN PATENT DOCUMENTS 1362842  8/1974  United Kingdom ............ 339/278 C

Primary Examiner—John McQuade
Attorney, Agent, or Firm—Fred Fisher

[57] ABSTRACT

The electrical terminal includes an electrical contact and a resilient, generally U-shaped reinforcing member. The contact includes a strip of metal of flexible material having good electrical conductivity, a low coefficient of friction, and the oxide of which is a relatively good conductor. The contact has at least a portion formed as a generally U-shaped member with a bight portion and having arms more closely spaced at its free ends than in the region of the bight portion. The arms are flared outwardly at their free ends. The U-shaped member is formed with a plurality of recesses which extend from the free ends through the bight portion. The reinforcing member is arranged substantially without the U-shaped member contact and embraces the arms, and is formed of material which retains its resiliency when subjected to heat. The resilient member is formed of a plurality of recess engaging portions connected at ends thereof with the portions being adapted to nest, at least partially, within the recesses. The recesses can be in the form of slots. The slots or recesses are narrower at their ends than at their bight portions, and the connected strips of the resilient member can be adapted to seat, at least partially, within the slots with the connected strips being wider at their bight portions than at their ends. The flexible material can be copper alloy, such as copper plated with tin, and the resilient material can be high carbon steel. Each of the formed arms, which were slotted, form furcated fingers and each pair, preferably, have facing convex surfaces. In some embodiments, only one of the contact and resilient member has a slot.

18 Claims, 17 Drawing Figures

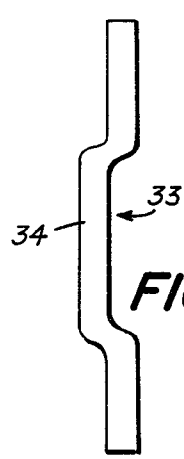
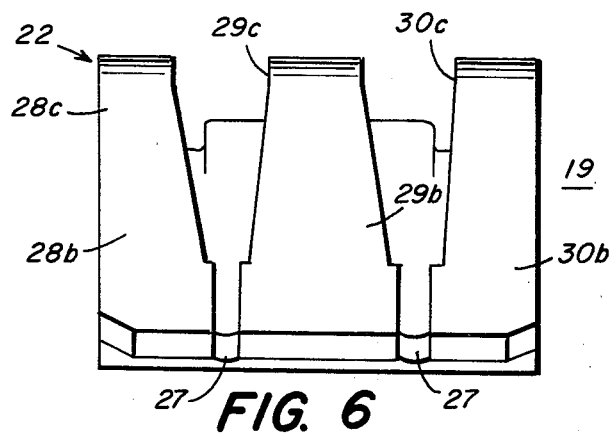
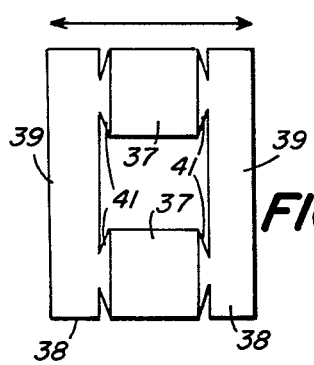
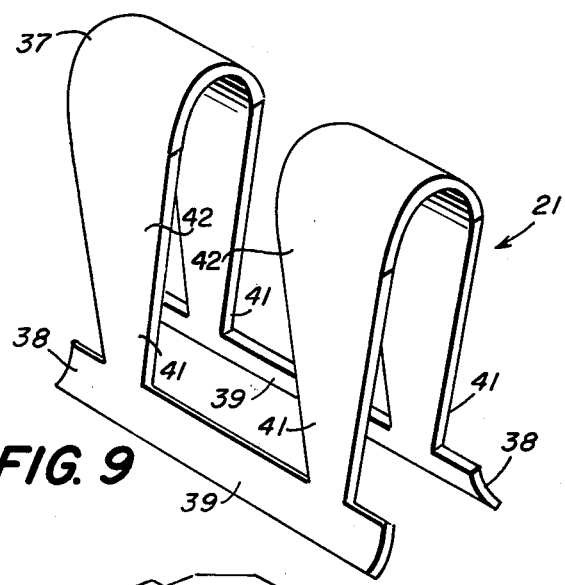
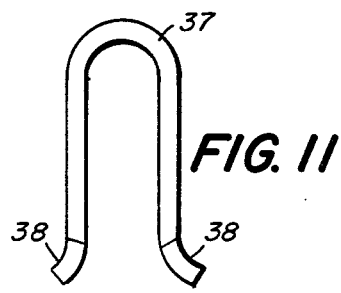
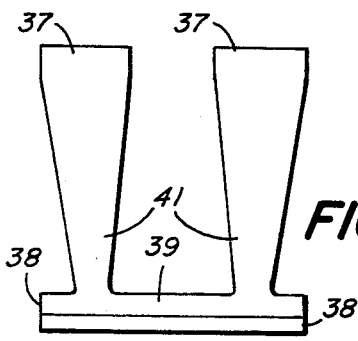
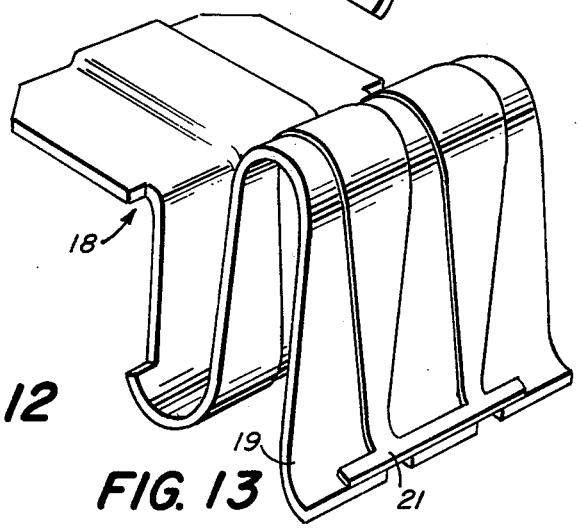

ELECTRICAL TERMINAL

BACKGROUND OF THE INVENTION

1. Field of the Invention

This invention relates to electrical terminals and, in particular, to conductor clips and clamps which form terminals for use in electrical devices, such as circuit breakers. Accordingly, it is a general object of this invention to provide new and improved electrical terminals of such character.

2. Description of the Prior Art

Typically, a bus clip type of electrical connector has two basic functions: (1) provide a contact force to form an electrical connection between two separable conductors; and (2) conduct electricity. Some conductor materials in the prior art have been used to furnish both a contact and clamping force and conduction. Such use of material is optimized when current levels and other conditions so permit. However, in higher current applications, it is often most practical to achieve high contact clamping force by use of a high carbon steel or special alloy spring. A spring clamp forces a clip conductor material against a mating member, thereby securing an electrical connection.

Some electrical connectors of the prior art include a U-shaped strip of metal of good electrical conductivity in conjunction with a resilient reinforcing member which acts as a spring. However, such combination connectors of the prior art are generally bulky, requiring excessive space for the utilization, and lack the space saving features of the instant invention.

SUMMARY OF THE INVENTION

Another object of this invention is to provide for a new and improved electrical terminal which can be coupled to a bus conductor without requiring unnecessarily high installation force.

Yet another object of this invention is to provide for a new and improved electrical terminal in which the connection force of the terminal with an associated bus conductor is independent of the strength of the molded plastic housing of an associated electrical circuit breaker or device.

Still another object of this invention is to provide for a new and improved electrical terminal for use in an electrical device in which the space requirement for the terminal is minimized.

Still yet another object of this invention is to provide for a new and improved electrical terminal which has slots formed therein in such a manner to improve flexibility of contact segments and to maximize efficiency of contact surfaces.

It is still yet another object of this invention to provide a new and improved electrical terminal including an electrical contact, and a resilient spring which fits substantially within unused space of the electrical contact and nests therewithin.

In accordance with one embodiment of the invention, an electrical terminal includes an electrical contact made of a strip of metal of flexible material having good electrical conductivity, a low coefficient of friction, and the oxide of which is unstable and will break down to produce a relatively good conductor, having at least a portion formed as a generally U-shaped member having a bight portion and having arms more closely spaced at its free ends than in the region of the bight portion. The arms are flared outwardly at the free ends. The U-shaped member is formed with a plurality of recesses which extend from the free ends through the bight portion. The terminal further includes a resilient, generally U-shaped reinforcing member arranged substantially without the U-shaped member contact and embraces the arms. The resilient member is formed of material which retains its resiliency when subjected to heat. The resilient member, preferably, is formed of a plurality of recess engaging portions connected at their ends. The connected portions are adapted to nest at least partially within the recesses. In certain features of the invention, the flexible material is tin plated copper, and the resilient material is high carbon steel. In certain features, the recesses are narrower at the free ends than at the bight portions, and the connected portions are wider at bight portions than at their ends. In other features of the invention, each of the aforesaid plurality can be two. In a separate embodiment, though not a preferred mode of practicing this invention, the resilient member can be formed with a single recess engaging portion.

In accordance with another embodiment of the invention, an electrical terminal includes an electrical contact having a strip of metal of flexible material with suitable electrical conductivity having at least a portion formed as a generally U-shaped member with a bight portion and adjoining arms. The U-shaped conductor member is formed with a plurality of slots such that furcated fingers formed therein are narrower at its bight portion than at its contact area. The terminal further includes a resilient, generally U-shaped reinforcing member arranged substantially without the U-shaped conductor member contact and embracing the contact arms. The resilient member is formed of a plurality of slot engaging portions connected at one or more ends thereof. The connected portions are adapted to nest at least partially within the slots. The portions are wider at bight portions thereof than at ends thereof. In accordance with certain features of the invention, the flexible material can be a suitably conductive material, such as tin plated copper and the resilient material can be such as stainless steel, high strength steel alloy, and high carbon steel.

In accordance with still yet another embodiment of the invention, an electrical terminal includes an electrical contact and a resilient, generally U-shaped reinforcing member. The contact includes a strip of metal of flexible material having good electrical conductivity, plated with a material having a low coefficient of friction, and the oxide of which is resolved into a relatively good conductor within normal temperature ranges, having at least a portion formed as a generally U-shaped member having a bight portion and having arms more closely spaced at its free ends than in the region of the bight portion. The arms are flared outwardly at the free ends. The U-shaped members are formed with slots which extend from the free ends through the bight portions, thereby forming furcated fingers, each connected by a respective bight. The resilient member is arranged substantially without the U-shaped member contact and embraces the arms and is formed of material which retains its resiliency when subjected to high pressure and heat. The resilient member, preferably, is formed of a plurality of strips connected at ends thereof. The connected strips are adapted to seat at least partially within the slots. In accordance with certain features of the invention, the flexible material is a copper alloy, and the resilient material is high carbon steel. In accordance with other features, the slots are narrower at the ends than at the bight portion, and the connected strips are wider at bight portions thereof than at ends thereof. The flexible material can be copper alloy (or pure copper), and the resilient material is high carbon steel. With other features of the invention, the furcated fingers of each pair have facing convex surfaces.

BRIEF DESCRIPTION OF THE DRAWING

Other objects, advantages, and features of this invention, together with the constructions and modes of operation, will become more apparent from the following description, when read in conjunction with the accompanying drawing, in which:

FIG. 6 is a modified side view thereof;

FIG. 7 is a sectional view taken along the line 7—7 of FIG. 4;

FIG. 9 is a perspective view of a resilient U-shaped reinforcing member used in the electrical terminal of this invention;

FIG. 10 is a top view of the member shown in FIG. 9;

FIG. 11 is a front view thereof;

FIG. 12 is a side view thereof;

FIG. 13 is a perspective view depicting the electrical contact and the resilient member in engagement with each other to form the electrical terminal in accordance with the preferred embodiment of this invention;

DESCRIPTION OF PREFERRED EMBODIMENTS

The electrical terminal of the present invention is ordinarily used in conjunction with a circuit breaker and will be shown thus in the following description. Circuit breakers of this general type are shown in U.S. Pat. Nos. 2,502,537; 2,878,332; and 3,114,023; all of which are assigned through mesne assignment to the same, or related, assignee as the present application.

Figure 2:
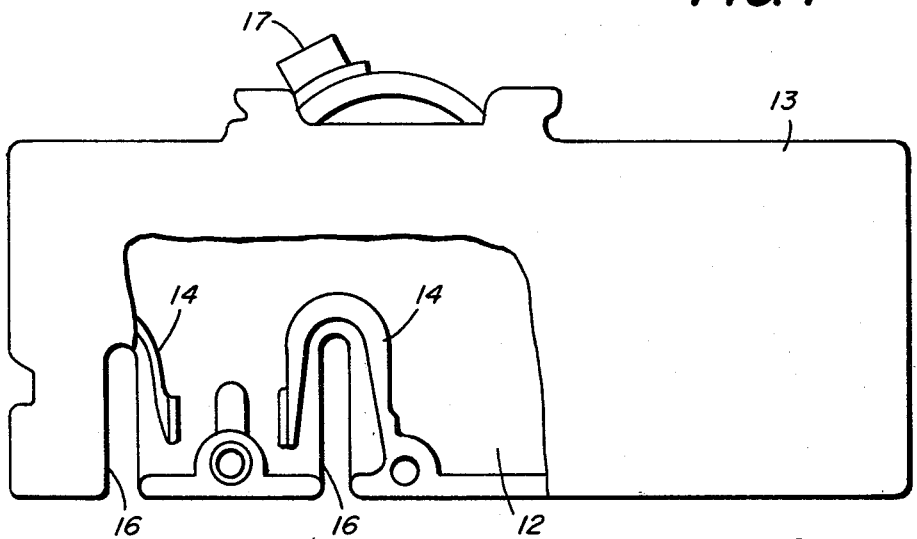
FIG. 2 is a front view thereof with a portion of the cover broken away, the interior of the device showing the molded case only.
Figure 14:
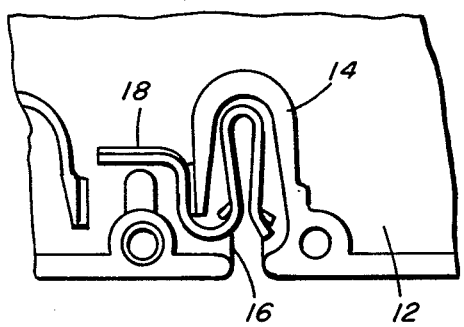
FIG. 14 is a front view of the electrical device of FIG. 1, with a part of the cover broken away, displaying the improved electrical terminal of this invention in place within the device housing.

A circuit breaker mechanism (not shown) is mounted in a case 11 consisting of a body 12 and a cover plate 13, the cover plate 13 being shown partly broken away in FIGS. 2 and 14.

Figure 1:
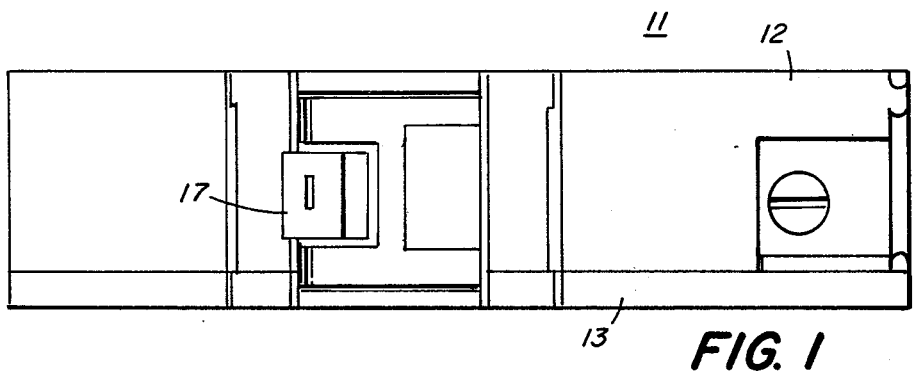
FIG. 1 is a top view of an electrical device housing.

The case 11 is plastic molded, with the body 12 being formed with a series of bosses 14—14, at least one of which is in location near an opening 16 for receiving a male electrical stab (not shown). One purpose of a boss 14 is to provide a guideway for the positioning of an electrical terminal in accordance with this invention, as shown more particularly at FIG. 14. However, for sake of clarity of this description, FIG. 2 does not depict any moving parts and does not depict the electrical terminal of this invention, but merely shows the case 11, including its body 12 and a portion of the cover plate 13. A switch handle 17 is shown in FIGS. 1 and 2 for reference purposes.

Figure 3:
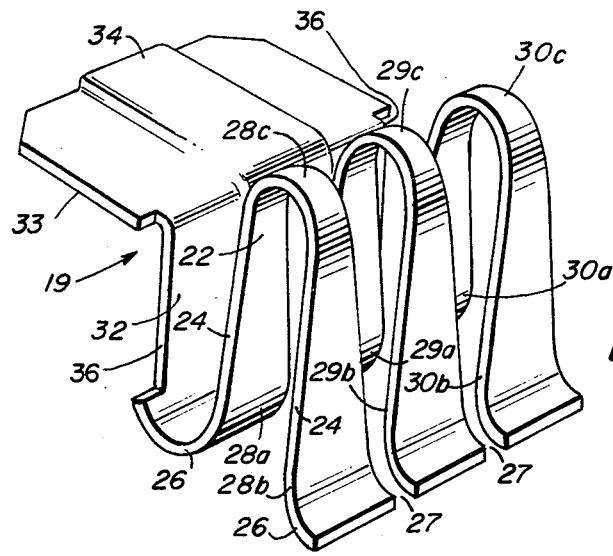
FIG. 3 is a perspective view of an electrical contact used with the electrical terminal of this invention.

The electrical terminal 18 in accordance with a preferred embodiment of this invention (shown in perspective view in FIG. 13) includes an electrical contact 19 (shown in perspective view in FIG. 3) and a resilient, generally U-shaped reinforcing member 21 (shown in perspective view in FIG. 9). The electrical contact 19 includes a strip of flexible material having good electrical conductivity, a low coefficient of friction, and the oxide of which converts easily under high temperature to a relatively good conductor. Such material can be a copper alloy, it can be copper which is tin plated, and the like. Referring to FIG. 3, the contact 19 has a portion 22 which is formed as a generally U-shaped member having a bight portion 23 and having arms 24—24 more closely spaced at their free ends than in the region of the bight portion 23. The arms 24—24 are flared outwardly at their free ends 26—26 and the U-shaped member 22 is formed with a plurality of slots 27—27 which extend from the free ends 26—26 through the bight portion 23, thereby forming a multiplicity of pairs 28A—28B, 29A—29B, and 30A—30B of furcated fingers, each pair being connected by a bight 28C, 29C, and 30C, respectively.

The slots 27—27, as shown in the drawing, more particularly at FIG. 6, are narrower at the ends than near the bight portion.

Multiple contact surfaces in conjunction with a mating stab, and flexibility of contact segments that form contact surfaces, are gained by slotting the electrical contact. However, by increasing the slot width to a maximum near the bights 28C, 29C, and 30C, additional flexibility of the respective fingers 28A—28B, 29A—29B, and 30A—30B, respectively, is achieved.

The configuration of the various slots 27—27, which aid in forming contact surfaces for the various pairs of fingers 28A—28B, 29A—29B, and 30A—30B of a new terminal 18, provides a place for the resilient, generally U-shaped reinforcing member or spring 21 which fits substantially in heretofore unused space of the electrical contact 19. The nesting of the spring 21 within the confines of the electrical contact 19 optimizes the space, material, and function as will be more apparent hereinafter.

The electrical contact 19 is formed with a return bend 32 with a right angle bend 33 formed therein. The shape of the electrical contact 19, including the bends 32, 33, the bight portion 23, and the arms 24—24, is so configured so that it can fit within the case 11 of the circuit breaker and be supported about the various bosses 14—14, as shown in FIG. 14.

A center bent hump 34, located on the right angle bend 33, has no bearing on this particular invention other than to provide the right angle bend 33 with greater rigidity, position, and strength.

Figure 8:
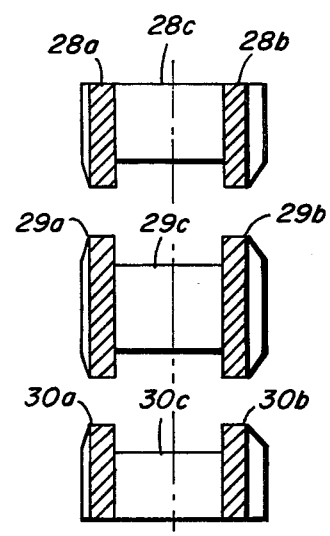
FIG. 8 is a sectional view taken along the line 8—8 of FIG. 5.
Figure 5:
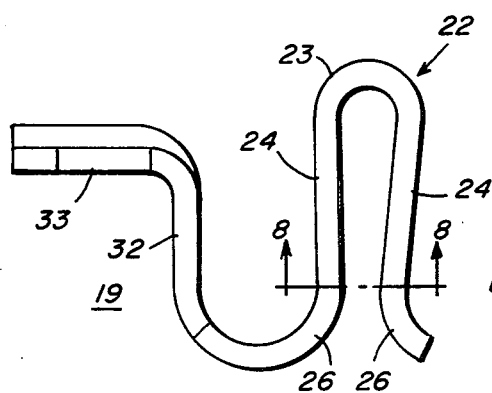
FIG. 5 is a front view thereof.

Referring to FIG. 8, there is shown a cross-sectional view taken along the line 8—8 of FIG. 5 which illustrates the shape of the contact surfaces for making electrical connection to a bus bar (not shown). It is noted that the contact surfaces are rounded and have a radiused feature; the inner surfaces of the various fingers 28A—28B, 29A—29B, and 30A—30B can have the outer extremities displaced from the center axis of the various fingers by distances of two to three thousandths of an inch. By so doing, the electrical contact 19 does not scratch the protective coatings of the surfaces of the contact or of the bus bar or stab in which the terminal comes into contact. That is, to express in another way, one would not desire a sharp contact surface because the mechanical fitting of a clip onto an aluminum bus would damage the tin coating thereon, defeating neutral insulation between galvanically opposed metals.

Figure 4:
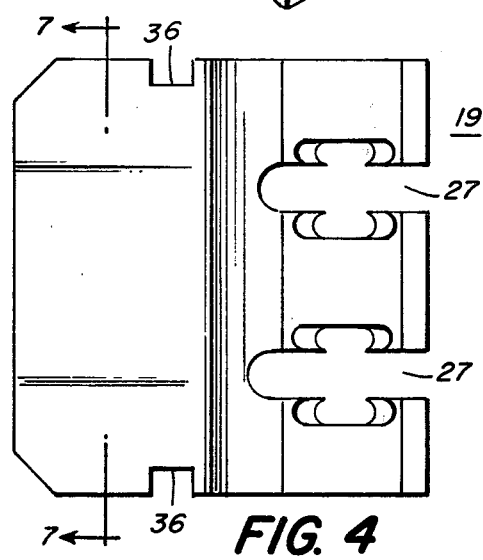
FIG. 4 is a top view of the contact shown in FIG. 3.

Referring to FIG. 4, slots 36—36 are provided on either side of the return bend, right angle bend portions 32, 33 so that the electrical contact 19 can fit into the case 11 and that there be a certain amount of play to enable contacts to be inserted into cases on a mass production basis, and to allow displacement of the contacts within the housings to accommodate rigidly positioned bus bars or stabs.

The material for the electrical contact 19, in a preferred embodiment, is electrolytic tough pitch copper, with a finish of tin plate onto the copper and a coating of a water soluble wax. Alternatively, copper alloy can be suitable. An embossed hump 34 is a feature of certain types of electrical contacts and can be deleted in other types.

Referring to FIGS. 9, 10, 11, and 12, there is shown a resilient, generally U-shaped reinforcing member 21 which is arranged to be substantially without the U-shaped member contact 19, as shown in FIG. 13, so as to embrace the arms 24—24 of the contact 19.

The resilient member 21 is formed of a material which retains its resiliency when subjected to heat. High carbon steel is preferred because of high stresses that occur in operation of a circuit breaker. FIG. 10 illustrates the grain direction of a reinforcing member 20 to be horizontal so as to obtain a higher strength. The member 21 is a U-shaped member having a pair of arms 38—38 which are furcated by a slot which extends from a connecting bight portion 37 to a point near the ends of the arms 38—38. Coupling portions 39—39 integrally join the ends 41—41 of a pair of fingers 42—42, which fingers extend from the portions 39—39 through the bight portion 37.

The slot in the resilient member 21 is angled in such a manner so as to be widest at the coupling portions 39—39 and narrowest at the bight portion 37, in opposite format to that slot or slots depicted and discussed in connection with the electrical contact 19.

With the combination as described, the conductive electrical contact 19 and resilient spring member 21 provide an electrical terminal 19 which yields a contact force sufficient to form an electrical connection between two separable conductors and to efficiently conduct electricity. In essence, synergism results from the high contact clamping force obtained by use of a high strength spring: electrical connection clamping force is delivered by a powerful high strength metal spring acting independently of position and size tolerances of a circuit breaker molded plastic housing and associated structures. The force required to install or plug a circuit breaker is independent of such tolerances. Thus, products employing the invention can safely and easily be applied in panel board bussing structures that vary to maximum adverse tolerances.

The connection force, in practicing the invention, is independent of the strength of the molded plastic housing for the case 11. Thus, a case 11 can continue to be manufactured from urea or other inexpensive materials. Molded urea housings are often used because of their desirable short circuit electrical properties and low cost. Though urea compounds have very low physical strength values for thermosets used in the circuit breaker industry, the high magnitude of the connection force delivered by an embodiment of this invention is not diminished or affected by strength properties of the molded housing, thereby affording safe optimization of circuit breaker housing material.

The resilient reinforcing member 21 and the electrical contact 19 nests with respect to each other to form a space efficient electrical terminal 18.

By the practice of this invention, high installation forces can be overcome, thereby providing a highly reliable connection without utilizing excessive space within the housing, which space could be allocated for other desired functions.

With the electrical contact 19 and reinforcing member 21 in engagement with each other so as to form the new and improved electrical terminal 18, when such electrical terminal is pressed onto a bus bar or stab, the contact segments open, whereby the various portions of the electrical contact 19 intimately engage with the various portions of the resilient reinforcing member 21. Thus, the opening of the contact segments of the electrical contact 19 introduces a deflection in the resilient reinforcing member 21 which, in turn, creates a force on the contact segments of the electrical contact 19, thereby pressing the contact surfaces of the contact segments against the bus bar or stab, producing the necessary pressure to secure an electrical joint.

It is noted that the resilient member 21 places the electrical contact 19 material under stresses in compression rather than stresses in tension. By acting adjacent to the contact surfaces, this permits the use of optimum conductor material without having to compromise conductivity for strength. That is, good conductor material is weak in tensile strength, and, typically, compression strengths are relatively high.

It is noted that FIG. 3 depicts two slots in the electrical contact 19, and that FIG. 9 depicts two bight portions of the reinforcing member 21 which are adapted to engage within the slots 27—27 of the electrical contact 19. There is no specific necessity that two slots and two bight portions alone be chosen as a desirable number. Other values can be utilized, depending upon sizes and other characteristics of various members, as depicted in FIGS. 13A, 13B, and 13C.

Figure 13A:
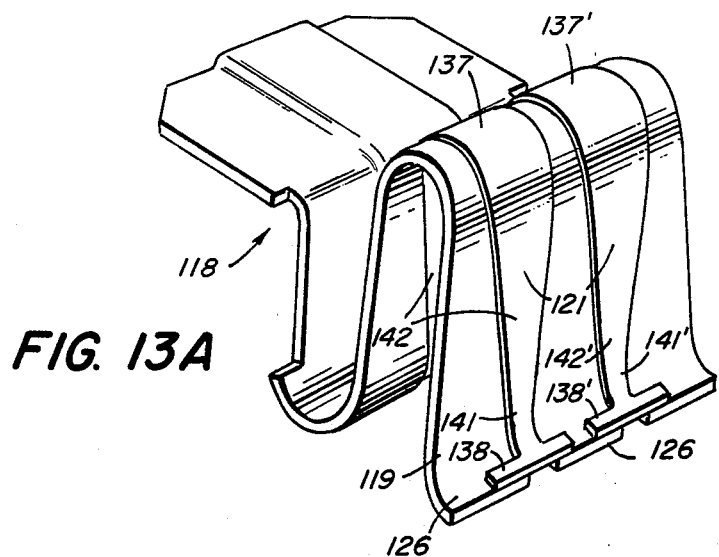
FIGS. 13A, 13B, and 13C are perspective views of electrical contacts and resilient members in engagement with each other to form electrical terminals in accordance with other embodiments of this invention.

FIG. 13A shows a perspective view of an embodiment of an electrical terminal 118 including an electrical contact 119 (similar to the contact 19 described above) and a "separated" U-shaped reinforcing member 121. The "separated" member 121 is similar to that shown in FIG. 9, except that it can take two different forms: (1) it can comprise two separate pieces, one piece including fingers 142—142 joining a bight portion 137, the other piece including fingers 142'—142' (one only shown) joining a bight portion 137', the end 141 of one piece having an arm 138 (differing from a similar arm 138' on the end 141' of the other piece) which applies a spring force to the free ends 126—126 of the contact 119; and (2) it can comprise an integral member having arms 138, 138' separated on one side (as depicted in FIG. 13A) and integrally connected on the other side (not shown in FIG. 13A).

Figure 13B:
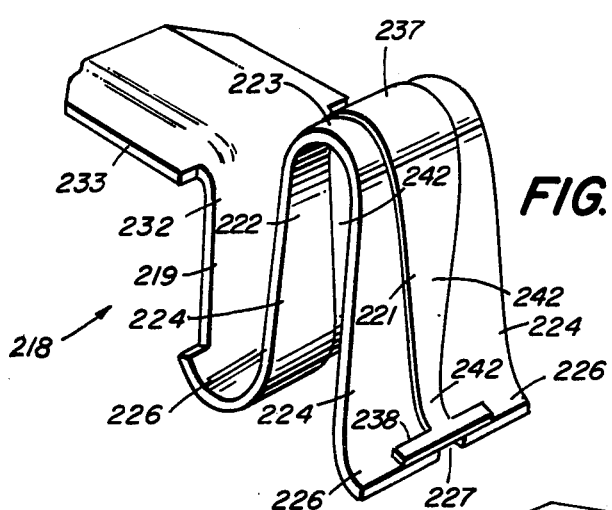

FIG. 13B shows a perspective view of another embodiment of an electrical terminal 218 including an electrical contact 219 and reinforcing member 221. The electrical contact 219 includes a strip of flexible material with a portion 222 formed as a generally U-shaped member having a bight portion 223 and bifurcated arms 224—224 which flare outwardly at their free ends 226—226, with a single slot 227. A return bend 232 and right angle bend 233 are formed therein. The reinforcing member 221, a U-shaped member having a pair of arms 242—242 and a connecting bight portion 237, is formed of material which retains its resiliency when subjected to heat, such as high carbon steel. The ends of the arms 242—242 are formed with respective dogs 238 which apply spring forces to the free ends 226—226 of the contact 219.

Figure 13C:
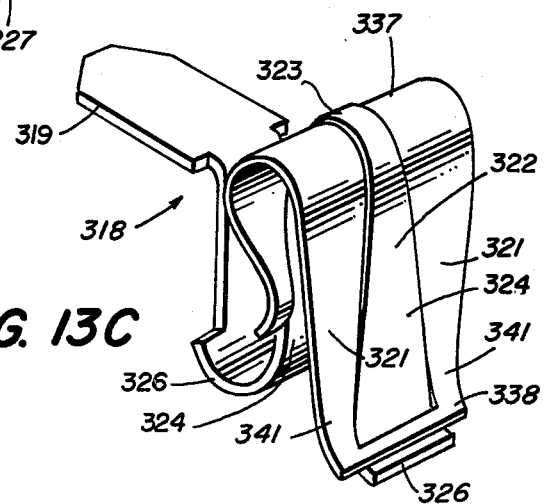

FIG. 13C shows a perspective view of still another embodiment of an electrical terminal 318 including an electrical contact 319 and reinforcing member 321. The electrical contact 319 includes a strip of flexible material having a portion 322 which is formed as a generally U-shaped member having a bight portion 323 and arms 324—324 which flare outwardly at their free ends 326—326, but no slot or slots. The arms 324—324 are more closely spaced at their free ends than in the region of the bight portion 323. The arms 324—324 are wider at their ends 326—326 than near the bight portion. The U-shaped reinforcing member 321 is similar to the member 21 shown in FIG. 9.

The electrical contact is widest at its arms and narrowest at its bight portion so as to provide for a large copper contact area. Further, with a narrow bight portion, greater flexibility is obtained.

A U-shaped conductor is desirable because two contact surfaces are provided in lieu of one. Thus, when plugging the U-shaped conductor onto a bus, redundancy provides for greater safety by doubling the number of contact surfaces with the U. When and if one of the contact surfaces degrades some, another continues to serve. If one side of a bus bar is contaminated, & thereby suffers a loss in surface conductivity, the other side can provide for efficient conductivity.

The resilient, generally U-shaped reinforcing member 21 can be formed of high carbon steel and, desirably, is mechanically zinc plated (i.e., is metallically coated in absence of free hydrogen).

As used in this specification, including the claims, the term "recess" is meant to be broadly defined to include terms as "slot" and "indentation".

While specific embodiments have been described, it will be apparent to those skilled in the art that various modifications can be performed without departing from the spirit and scope of this invention. For example, in lieu of slots in which portions of the reinforcing member can seat therewithin, identations can be utilized: electrical contacts can be formed with indentations, and reinforcing members can be formed with mating indentation engaging portions. Other variations will be apparent to those skilled in the art without departing from the spirit and scope of the appended claims.

What is claimed is:

1. An electrical terminal comprising
an electrical contact including a strip of metal of flexible material having good electrical conductivity, a low coefficient of friction, and the oxide of which is unstable and can break down to produce a relatively good conductor, having at least a portion formed as a generally U-shaped member having a bight portion and having arms more closely spaced at its free ends than in the region of said bight portion, said arms being flared outwardly at said free ends; said U-shaped member being formed with a plurality of recesses which extend from said free ends through said bight portion; and
a resilient, generally U-shaped reinforcing member arranged substantially without said U-shaped member contact and embracing said arms, and being formed of material which retains its resiliency when subjected to heat; said resilient member being formed of a plurality of recess engaging portions connected at ends thereof, said connected portions being adapted to nest, at least partially, within said recesses.

2. The terminal as recited in claim 1 wherein
said flexible material is tin plated copper; and
said resilient material is high carbon steel.

3. The terminal as recited in claim 1 wherein
said recesses are narrower at said free ends than at said bight portion; and
said connected portions are wider at bight portions thereof than at ends thereof.

4. The terminal as recited in claim 1 wherein
each of said plurality is two.

5. An electrical terminal comprising
an electrical contact including a strip of metal of flexible material having good electrical conductivity, a low coefficient of friction, and the oxide of which is unstable and can break down to produce a relatively good conductor, having at least a portion formed as a generally U-shaped member having a bight portion and having arms more closely spaced at its free ends than in the region of said bight portion, said arms being flared outwardly at said free ends; said U-shaped member being formed with a recess which extends from said free ends through said bight portion; and
a resilient, generally U-shaped reinforcing member arranged substantially without said U-shaped member contact and embracing said arms, and being formed of material which retains its resiliency when subjected to heat; said resilient member being formed of a recess engaging portion adapted to nest, at least partially, within said recess.

6. An electrical terminal comprising
an electrical contact including a strip of metal of flexible material having good electrical conductivity, a low coefficient of friction, and the oxide of which is unstable and can break down to produce a relatively good conductor, having at least a portion formed as a generally U-shaped member having a bight portion and having arms more closely spaced at its free ends than in the region of said bight portion, said arms being flared outwardly at said free ends; said U-shaped member being formed with a recess which extends from said free ends through said bight portion; and
a resilient, generally U-shaped reinforcing member arranged substantially without said U-shaped member contact and embracing said arms, and being formed of material which retains its resiliency when subjected to heat; said resilient member being adapted to nest, at least partially, within said recess.

7. An electrical terminal comprising
an electrical contact including a strip of metal of flexible material having good electrical conductivity, a low coefficient of friction, and the oxide of which is unstable and can break down to produce a relatively good conductor, having at least a portion formed as a generally U-shaped member having a bight portion and having arms more closely spaced at its free ends than in the region of said bight portion, said arms being flared outwardly at said free ends; and a resilient, generally U-shaped reinforcing member arranged substantially without said U-shaped member contact and embracing said arms, and being formed of material which retains its resiliency when subjected to heat; said resilient member being formed of a recess engaging portion, said arms being adapted to nest, at least partially, within said recess engaging portion.

8. An electrical terminal comprising an electrical contact including a strip of metal of flexible material having good electrical conductivity, having at least a portion formed as a generally U-shaped member with a bight portion and adjoining arms; said U-shaped member being formed with a plurality of slots such that furcated fingers formed therein are narrower at its bight portion than at its ends; and a resilient, generally U-shaped reinforcing member arranged substantially without said U-shaped member contact and embracing said arms; said resilient member being formed of a plurality of slot engaging portions connected at ends thereof, said connected portions being adapted to nest, at least partially, within such slots, said portions being wider at bight portions thereof than at ends thereof.

9. The terminal as recited in claim 8 wherein said flexible material is tin plated copper; and said resilient material is high carbon steel.

10. An electrical terminal comprising an electrical contact including a strip of metal of flexible material having good electrical conductivity, plated with material having a low coefficient of friction, and the oxide of which is resolved into a relatively good conductor within normal temperature ranges, having at least a portion formed as a generally U-shaped member having a bight portion and having arms more closely spaced at its free ends than in the region of said bight portion, said arms being flared outwardly at said free ends; said U-shaped member being formed with a plurality of slots which extend from said free ends through said bight portion, thereby forming a multiplicity of pairs of furcated fingers, each pair connected by a respective bight; and a resilient, generally U-shaped reinforcing member arranged substantially without said U-shaped member contact and embracing said arms, and being formed of material which retains its resiliency when subjected to high pressure and heat; said resilient member being formed of a plurality of strips connected at ends thereof, said connected strips being adapted to nest, at least partially, within said slots.

11. The terminal as recited in claim 10 wherein said flexible material is a copper alloy; and said resilient material is high carbon steel.

12. The terminal as recited in claim 10 wherein said slots are narrower at said free ends than at said bight portion; and said connected strips are wider at bight portions thereof than at ends thereof.

13. The terminal as recited in claim 12 wherein said flexible material is a copper alloy; and said resilient material is high carbon steel.

14. The terminal as recited in claim 10 wherein furcated fingers of each pair have facing convex surfaces.

15. An electrical terminal comprising an electrical contact including a strip of metal of flexible material having good electrical conductivity, having at least a portion formed as a generally U-shaped member with a bight portion and adjoining arms; said U-shaped member being formed with a slot such that furcated fingers formed therein are narrower at its bight portion than at its ends; and a resilient, generally U-shaped reinforcing member arranged substantially without said U-shaped member contact and embracing said arms; said resilient member being adapted to nest, at least partially, within such slot, said resilient member being wider at a bight portion thereof than at ends thereof.

16. An electrical terminal comprising an electrical contact including a strip of metal of flexible material having good electrical conductivity, having at least a portion formed as a generally U-shaped member with a bight portion and adjoining arms, such that the formed arms are narrower at its bight portion than at its ends; and a resilient, generally U-shaped reinforcing member arranged substantially without said U-shaped member contact and embracing said arms; said resilient member being formed with an enclosed slot, said arms being adapted to nest, at least partially, within said slot, said resilient member being wider at a bight portion thereof than at ends thereof.

17. An electrical terminal comprising an electrical contact including a strip of metal of flexible material having good electrical conductivity, plated with material having a low coeffitient of friction, and the oxide of which is resolved into a relatively good conductor within normal temperature ranges, having at least a portion formed as a generally U-shaped member having a bight portion and having arms more closely spaced at its free ends than in the region of said bight portion, said arms being flared outwardly at said free ends; said U-shaped member being formed with a slot which extends from said free ends through said bight portion, thereby forming two pairs of furcated fingers, each pair connected by a respective bight; and a resilient, generally U-shaped reinforcing member arranged substantially without said U-shaped member contact and embracing said arms, and being formed of material which retains its resiliency when subjected to high pressure and heat; said resilient member being adapted to seat, at least partially, within said slot.

18. An electrical terminal comprising an electrical contact including a strip of metal of flexible material having good electrical conductivity, plated with material having a low coefficient of friction, and the oxide of which is resolved into a relatively good conductor within normal temperature ranges, having at least a portion formed as a generally U-shaped member having a bight portion and having arms more closely spaced at its free ends than in the region of said bight portion, said arms being flared outwardly at said free ends; and a resilient, generally U-shaped reinforcing member arranged substantially without said U-shaped member contact and embracing said arms, and being formed of material which retains its resiliency when subjected to high pressure and heat; said resilient member being formed with an enclosed slot thereof, said arms being adapted to seat, at least partially, within said slot.

* * * * *